June 12, 1928.

W. C. BRINTON, JR

WASHER

Filed Oct. 8, 1925

1,673,440

INVENTOR
William C. Brinton, Jr.
BY White & Prost
his ATTORNEYS

Patented June 12, 1928.

1,673,440

UNITED STATES PATENT OFFICE.

WILLIAM C. BRINTON, JR., OF LARKSPUR, CALIFORNIA, ASSIGNOR TO THE GREASOMETER CORPORATION, OF SAN FRANCISCO, CALIFORNIA, A CORPORATION OF CALIFORNIA.

WASHER.

Application filed October 8, 1925. Serial No. 61,378.

This invention relates to washers for pistons and the like and has for its object the provision of an improved device of this character. More particularly, the invention relates to washers made of a heat resisting and an oil resisting compound, and while not limited to use in any particular device, is especially adapted for use in a grease cup of the character shown in my copending application, Serial No. 38,957, filed June 23, 1925, entitled Grease cup. Heretofore, it has been the practice to provide washers made of a suitable flexible material partially impervious to oil with a peripheral flange or skirt, and holding the washer between metallic discs, with the flange of the washer extending over the edge of one of the discs. In this arrangement, the disc surrounded by the flange was made substantially the same size as the body of the washer, so that the peripheral flange of the washer was squeezed more or less tightly between the periphery of the disc and the surface of the cylinder in which the same operated. In such an arrangement, substantially the entire exterior surface of the peripheral flange of the washer engaged the interior surface of the cylinder, thereby increasing the friction between the same as well as wiping practically all of the lubricant from the cylinder surface.

It is therefore an object of the present invention to provide a washer in which the undesirable features pointed out are eliminated. In carrying out my invention, I provide a washer of a suitable heat resisting and oil resisting substance, which is more or less saucer-shaped, having a flat body with an upturned peripheral flange or a curled edge. Said substance enlarges when impregnated with oil, and the washer is originally formed of a diameter smaller than the required diameter and then impregnated with oil to cause it to expand or grow to the required diameter. This treatment also prevents the oxidization of the washer, which is an important factor, since a considerable period might elapse between the time of its manufacture and the time it is sold. The flange either curves rearwardly or is curled back in the form of a roll so as to provide a resilient or yielding contact with the cylinder surface and thereby reduce the friction therewith. By this arrangement, only a small part of the peripheral surface of the washer engages the cylinder, making what might be termed substantially a line contact therewith, thereby further reducing the friction as well as preventing the complete wiping of the lubricant from the cylinder, and at the same time providing a perfect seal.

It is therefore a further object of the invention to provide a device of the character described having a perfect seal with a minimum of friction.

The invention possesses other advantageous features, some of which with the foregoing will be set forth at length in the following description where I shall outline in full that form of the invention which I have selected for illustration in the drawings accompanying and forming part of the present specification. In said drawings I have shown one form of the invention but I do not wish to be limited thereto, since the invention as expressed in the claim may be embodied in a plurality of other forms.

Referring to the drawings.

Figure 1:
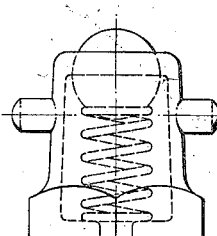
Figure 1 is a vertical sectional view of a grease cup provided with my improved washer.
Figure 1:
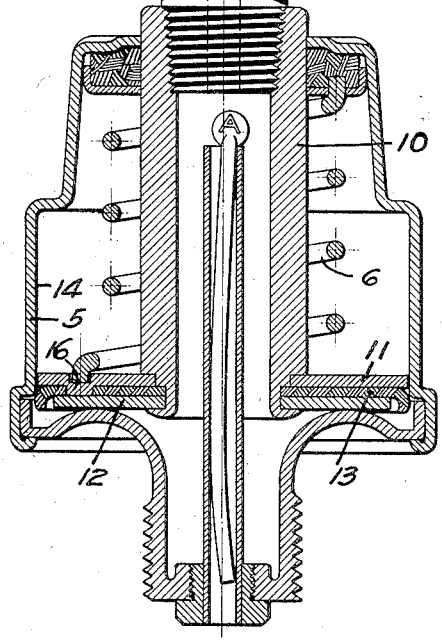

In Fig. 1 I have shown a grease cup having a hollow cylindrical stem 10 carrying at its lower end metallic discs 11 and 12 between which a washer 13 embodying my present invention is held. The piston formed by said discs and washer moves within a cylinder 5, being acted upon by a spring 6. A further description of the grease cup itself is not necessary in connection with the present invention, the same being described and claimed in my copending patent above referred to.

Figure 3:
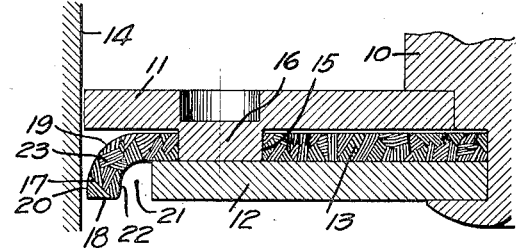
Figure 3 is an enlarged sectional view of the washer illustrating its relative size with respect to the diameter of the cylinder before treated with oil to make it expand.
Figure 2:
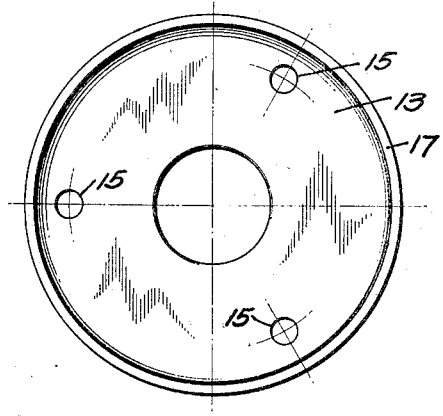
Figure 2 is a plan view of my improved washer.
Figure 4:
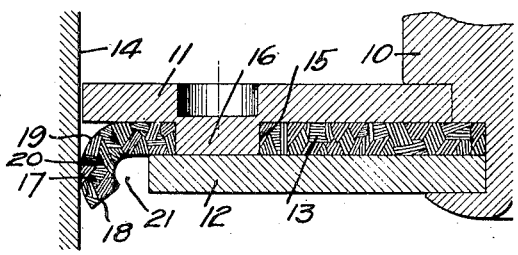
Figure 4 is a view similar to Fig. 3 of the washer after treatment with oil.

Referring now to Figs. 3 and 4 in which a piston stem 10, the lower end of the same only being partly shown, carries metallic or other suitable rigid discs 11 and 12 between which is held a washer 13, the piston formed by said discs and washer being adapted to operate in a cylinder, the interior surface thereof being indicated at 14. The washer 13 is made of a flexible heat resisting and oil resisting substance. In practice, I have found a very satisfactory washer results when made of from 25% to 35% of para rubber, and 6% to 11% of sulphur, with the addition of ground asbestos and graphite, the same being vulcanized under heat and pressure. The washer 13 is made of smaller diameter than the required diameter, as shown in Fig. 3, and is then saturated or impregnated with oil, causing it to swell and enlarge or grow to the required size as shown in Fig. 4.

The washer 13 is provided with a suitable number of apertures 15, and the disc 11 is formed with a suitable number of projections 16 adapted to fit the apertures 15. The projections 16 are of a proper height, preferably a little higher than the normal thickness of the washer 13 before it is treated with oil, as shown in Fig. 3, so that the washer 13 after treatment may be held in position by said projections without compressing the washer 13 between the discs 11 and 12, as shown in Fig. 4. It will be observed that the disc 12, which forms the face of the piston, is considerably smaller than the disc 11 which forms the back of the piston. The diameter of the back disc 11 is slightly smaller than the diameter of the cylinder in which the piston operates, while the diameter of the face of the disc is less than the back disc a distance substantially equal to four times the thickness of the washer 13, whereby the distance between the periphery of the face disc 12 and the surface 14 of the cylinder is about twice as great as the thickness of the washer 13. The washer 13 is molded or formed in the shape of a saucer, that is, a flat disc with a curved flange 17 on its periphery directed toward the face side of the piston. The curvature of the flange 17 commences from a point slightly beyond the periphery of the disc 12 and is such that when the edge 18 is flush with the plane of the exterior surface of the face disc 12, the washer 13 will make substantially a point or line contact with the cylinder surface 14 as shown in Fig. 4. By this construction, the rear surface 19 of the washer makes substantially a line contact on the cylinder surface 14 at a point 20 and a space indicated at 21 between the inner surface 22 of the flange 17 and the periphery of the face disc 12. It will also be observed that the curvature of the rear surface 19 of the washer 13 commences at a point on the interior surface of the disc 11 distant from its periphery. The washer 13 is also preferably formed slightly thinner at the point of the sharpest curvature of the flange 17 as indicated at 23. From the foregoing description, it will be seen that when the piston reciprocates, the washer 13 provides a perfect seal, and at the same time is not wedged against the cylinder surface, or contacts with the same sufficiently to wipe the lubricant entirely therefrom. While the flange 17 provides a perfect seal, it does not rigidly engage the cylinder surface 14, the contact being yielding or resilient, due to the resiliency of the washer, as well as the spaces between the same and the discs 11 and 12 above described, which permit the flange to adjust itself against the surface 14.

I claim:

The method of forming a washer of a resilient material which enlarges when impregnated with oil which consists in originally forming the washer in the shape of a disc with a peripheral flange of smaller diameter than the required diameter of the washer and then treating the washer with oil to cause it to enlarge to the required diameter.

In testimony whereof, I have hereunto set my hand.

WILLIAM C. BRINTON, Jr.